United States Patent [19]
Hwang

[11] Patent Number: 5,498,976
[45] Date of Patent: Mar. 12, 1996

[54] PARALLEL BUFFER/DRIVER CONFIGURATION BETWEEN DATA SENDING TERMINAL AND DATA RECEIVING TERMINAL

[75] Inventor: Ching-Tung Hwang, Taoyuan, Taiwan

[73] Assignee: Acer Incorporated, Hsinchu, Taiwan

[21] Appl. No.: 355,420

[22] Filed: Dec. 13, 1994

Related U.S. Application Data

[63] Continuation of Ser. No. 604,586, Oct. 26, 1990, abandoned.

[51] Int. Cl.$^6$ ............................................. H03K 17/16
[52] U.S. Cl. ....................................... 326/30; 326/82
[58] Field of Search ..................... 365/189.01, 189.05; 326/30, 82

[56] References Cited

U.S. PATENT DOCUMENTS

| | | | |
|---|---|---|---|
| 3,979,732 | 9/1976 | Hepworth et al. ................. | 307/475 X |
| 4,224,531 | 9/1980 | Ebihara et al. .................... | 307/475 X |
| 4,495,626 | 1/1985 | Brunin et al. ..................... | 307/475 X |
| 4,598,216 | 7/1986 | Lauffer et al. ..................... | 307/443 |
| 4,647,797 | 3/1987 | Sanwo et al. ...................... | 307/443 |
| 4,697,107 | 9/1987 | Haines ............................... | 307/474 |
| 4,766,334 | 8/1988 | Warner .............................. | 307/443 X |
| 4,774,422 | 9/1988 | Donaldson et al. ................. | 307/475 |
| 4,816,702 | 3/1989 | Salina et al. ....................... | 307/475 |
| 4,855,619 | 8/1989 | Hsieh et al. ....................... | 307/443 |
| 4,958,323 | 9/1990 | Sugawara et al. ................. | 365/189.01 |
| 4,970,410 | 11/1990 | Matsushita et al. ............... | 307/475 X |
| 5,017,813 | 5/1991 | Galbraith et al. ................. | 307/475 X |
| 5,107,507 | 4/1992 | Bland et al. ....................... | 371/49.1 |

*Primary Examiner*—David C. Nelms
*Assistant Examiner*—Son Dinh
*Attorney, Agent, or Firm*—Townsend and Townsend and Crew

[57] ABSTRACT

A buffer/driver is arranged in parallel between the data sending terminal and the data receiving terminal of a data transmission system. The SETUP time and HOLD time requirements of the data receiving terminal may be satisfied at the same time in accordance with the present invention. A low end, which has medium amount of time delay, buffer/driver may be used in this present invention to achieve a high performance of the data transmission which is usually possible in the past through the utilization of a high end buffer/driver, which has extremely small amount of time delay.

10 Claims, 4 Drawing Sheets

PARALLEL BUFFER/DRIVER CONFIGURATION BETWEEN DATA SENDING TERMINAL AND DATA RECEIVING TERMINAL

This is a Continuation of application Ser. No. 07/604,586, filed Oct. 26, 1990, now abandoned.

FIELD OF INVENTION

This invention relates to buffer/driver arrangement between a data sending terminal, such as Dynamic Random Access Memory (DRAM), and a data receiving terminal, such as a Central Processing Unit (CPU), of a data processing system.

BACKGROUND ART

In an electronic data processing system, data are transmitted from the data sending terminals to receiving terminals from time to time. Some devices are only data sources or data sinks; however, some devices may act as both data source and data sink. For example, the CPU and the DRAM of modern data processing systems are data both sending and receiving terminals.

Some data sending terminal, such as CPU, and data receiving terminals, such as the DRAM of a memory device, are commercially available from the system design point of view. The system designer must design the system circuits to meet the specifications inherent in the vendor's devices as well as the specifications the target data processing system intends to achieve.

While designing a data processing system, there are at least two criteria to be met on the side of the data receiving terminal. First, the specification of the data receiving terminal, such as the CPU, requires a minimum value the HOLD time. The HOLD time $(t_h)$ is the time span of data is held valid after receiving completion of the data. Secondly, the specification of the data receiving terminal requires a minimum value of SETUP time. The SETUP time $(t_s)$ is the time span of data existing validly before the commencement of receiving data.

Referring to FIG. 1, the timing diagram of a typical memory read cycle has been depicted. In FIG. 1, the ALE (Address Latch Enable) is a signal which notifies the memory device the address bus is starting a bus cycle, ADDRESS signal tells to which location of tile memory device data access is desired, and MEMR is a memory read signal to the memory device. The shown $t_h$ is the HOLD time and the $t_s$ is the SETUP time of the data receiving terminal.

In some instances where the minimum HOLD time of a data receiving terminal is not met by the data sent by the data sending terminal, an off-the-shelf buffer/driver such as TTL 74646 may be implemented between the receiving terminal and the sending terminal. Alternatively, instead of using a commercial component such as TTL 74646, a circuit block, functioning as TTL 74646, on the system board designed by the System designer may do the same work. The buffer/driver first latches the data, and then re-transmits the data to the data receiving terminal. The data being sent will be held valid by the buffer/driver until the HOLD time of the receiving terminal has been met. This prior art arrangement of the buffer/driver, shown in FIG. 2(a), however, would cause delay of the data transmission, due to the serial configuration of the buffer/driver, resulting in the shorter SETUP time for the data receiving terminal. This shorter SETUP time will not always satisfy the requirement on the SETUP time of the data receiving terminal. The timing diagram of the prior art arrangement of buffer/driver is shown in FIG. 2(b).

Another approach to solve the above problem is to implement a circuit in the data processing system to generate a NOREADY signal forcing the data sending terminal to hold the data valid until the minimum HOLD time of the data receiving terminal has been satisfied. In the case of the CPU, the NOREADY signal is input to the READY pin of the CPU forcing the CPU to insert wait states until the minimum HOLD time requirement of the data receiving terminal has been met. This is also a very common practice. However, this practice slows down the speed of the central processing unit and is not recommended in high speed data processing system design.

SUMMARY OF THE INVENTION

It is an object of the present invention to provide a buffer/driver in parallel between the data sending terminal and data receiving terminal such that the HOLD time and SETUP time requirements of the data receiving terminal are met at the same time.

It is another object of the present invention to incorporate a low end buffer/driver, which has a medium amount of time delay, in a data transmission system to achieve a high performance of the data transmission which has been possible in the past only through the utilization of a high end buffer/driver with small amount of time delay.

It is still another object of the present invention to reduce the pin numbers required for data transmission on an ASIC (Application Specific Integrated Circuit) chip.

DETAILED DESCRIPTION OF THE PREFERRED EMBODIMENT

From the foregoing discussion on the background art of the present invention, the task of a system designer is to design the system circuits to meet the specifications of the off-the-shelf components once they are chosen.

Figure 2B:
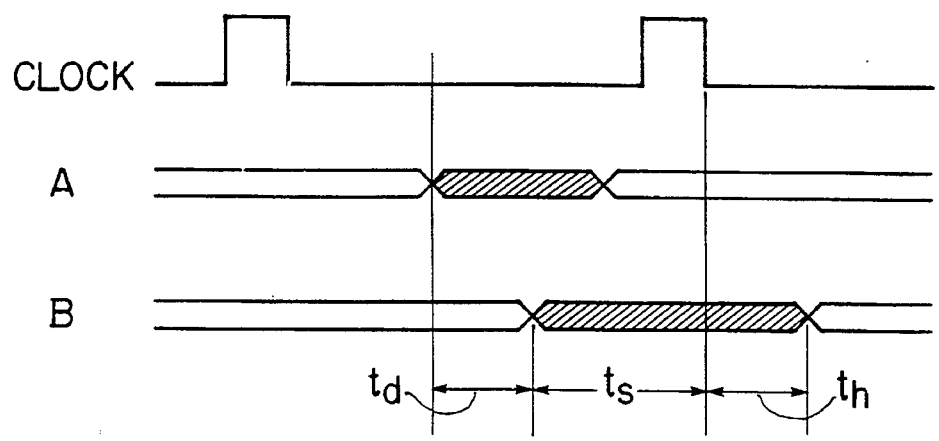
FIG. 2(b) shows the timing diagram of the FIG. 2(a).
Figure 3A:
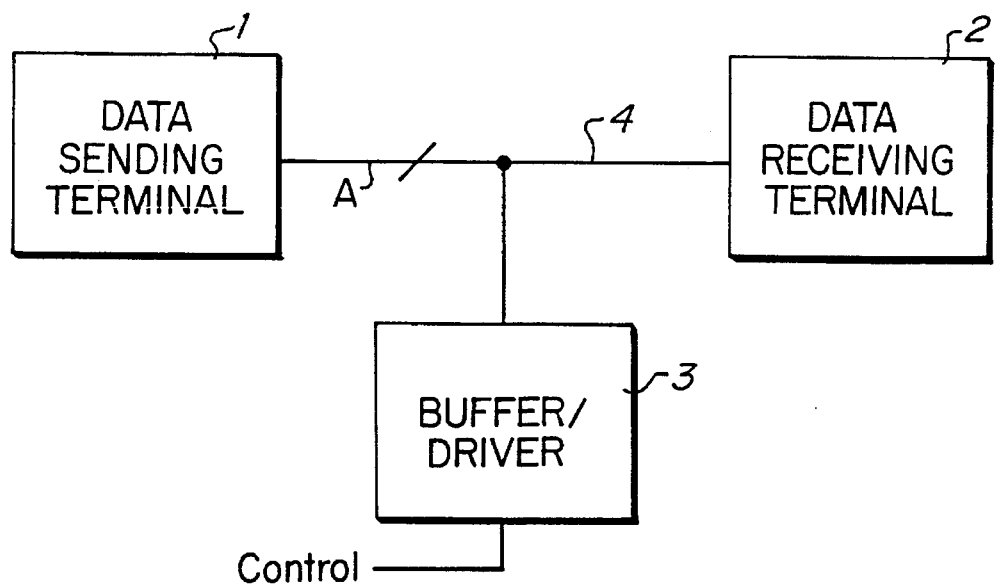
FIG. 3(a) shows the buffer/driver in parallel between the data sending terminal and receiving terminal.
Figure 3B:
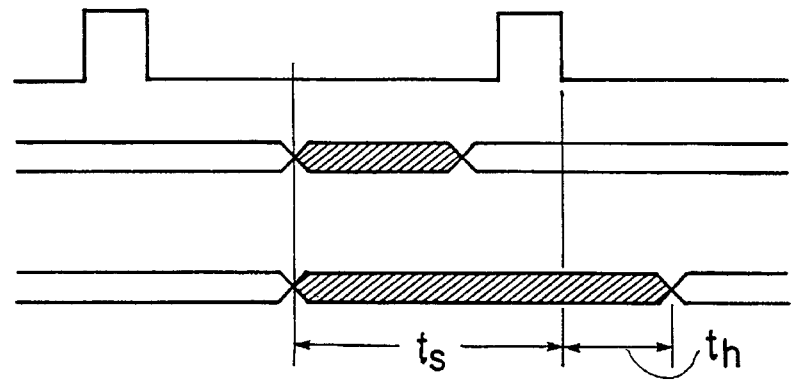
FIG. 3(b) shows the timing diagram of the FIG. 3(a).

As disclosed in FIG. 3(a), a data transmission system in accordance with the present invention is shown. The data sending terminal 1, data receiving terminal 2 and the buffer/driver 3 are coupled together through a bus B. The bus line shown in the figures of the present invention is represented by a single line only for simplicity. In a real case, the data bus may include 8, 16 or 32 data lines depending on the number of data bits the computer system has. The buffer/driver 3 latches the data signal and transmits the same to the bus B after a time delay caused by the buffer/driver 3. The transmission lasts for a predetermined amount of time. Observing from the data receiving terminal 2, the data signal B exists for a longer period of time ($t_s+t_h$) than that of the prior art. The timing of the present invention is shown in FIG. 3(b). In FIG. 3(b), the signal A is the data sent by the data sending terminal 1 and the signal B is the data received by the data receiving terminal 2. Comparing FIG. 2(b) and FIG. 3(b), the HOLD time ($t_h$) is the same to the data receiving terminal 2 and the SETUP time ($t_s$) for this invention is longer than that of the prior art. As a result, the SETUP time requirement of the data receiving terminal 2 may be met much more easily using this invention.

Figure 4A:
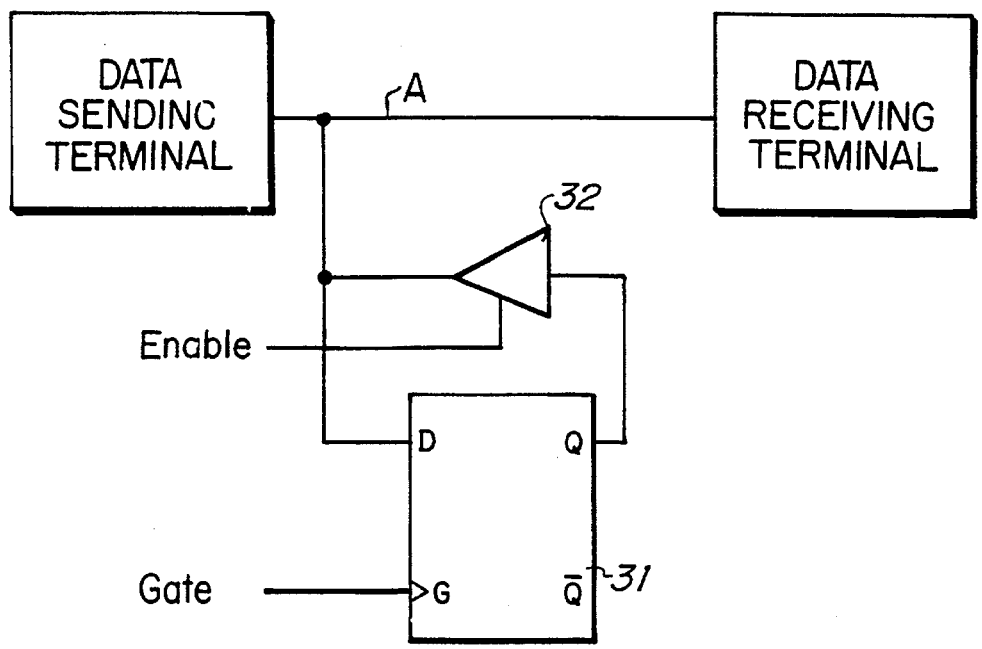
FIG. 4(a) shows the detailed embodiments of the buffer/driver in accordance with the present invention.
Figure 4B:
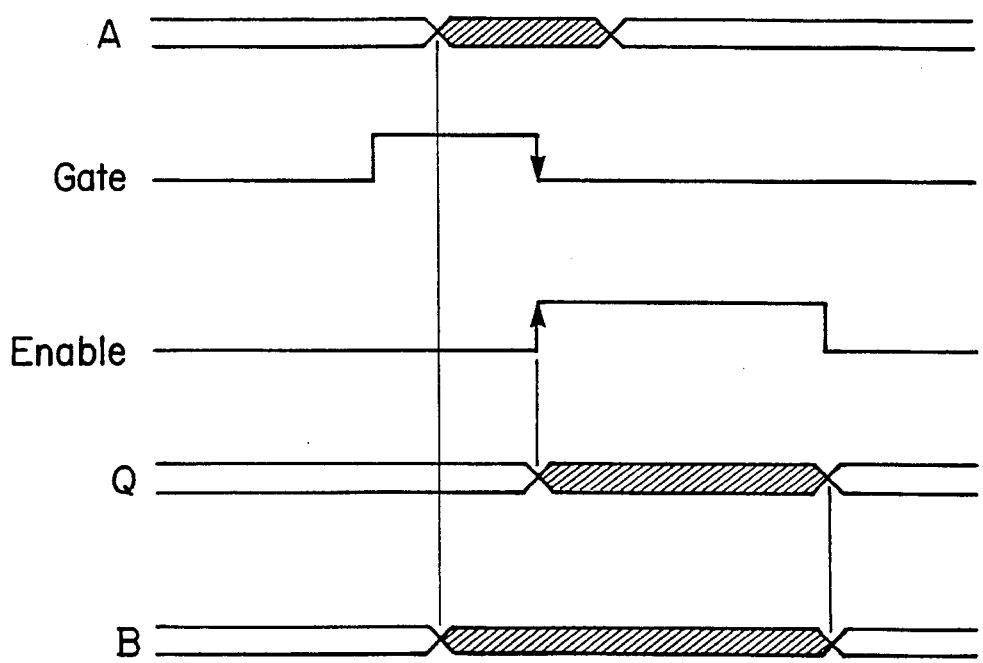
FIG. 4(b) shows the timing diagram of the FIG. 4(a).

A detailed embodiment of the buffer/driver 3, together with the data sending terminal 1 and receiving terminal 2, is shown in FIG. 4(a). As shown, the buffer/driver 3 includes a latch 31 and buffer 32. The D input of the latch 31 is connected to the data sending terminal 1 and receiving terminal 2 through the data bus B. The G input of the latch 31 is connected to the GATE signal among the CONTROL signals. The data present on the data bus B are latched in the latch 31 on the negative transition of the GATE signal. The Q output of the latch 31 is coupled to the input of the buffer 32 and the output of the buffer 32 is coupled to the data receiving terminal 2 through data bus B under the control of an ENABLE signal among the CONTROL signals. The timing relation of the related signals of FIG. 4(a) and the data signal A of FIG. 3(b) is disclosed in FIG. 4(b) for in-depth understanding of present invention. It can be found the ENABLE signal is going high as the GATE signal is going low.

In the preferred embodiment of this invention, a self-design buffer/driver circuit 3 instead of the off-the-shelf buffer/driver is recommended. This is because the designer may have the option to change the design of the buffer/driver circuit to fulfill the system requirements. In this way, the HOLD and SETUP time of the self-design buffer/driver 3 do not create another difficulty for the system as shown in FIG. 3(a) while trying to overcome the problems posed by the prior art.

Through the implementation of this invention, a low end buffer/driver, which has a medium amount of time delay, may be used to achieve a high performance of data transmission which has been possible in the past through the utilization of a high end buffer/driver, which has an extremely small amount of time delay.

Figure 1:
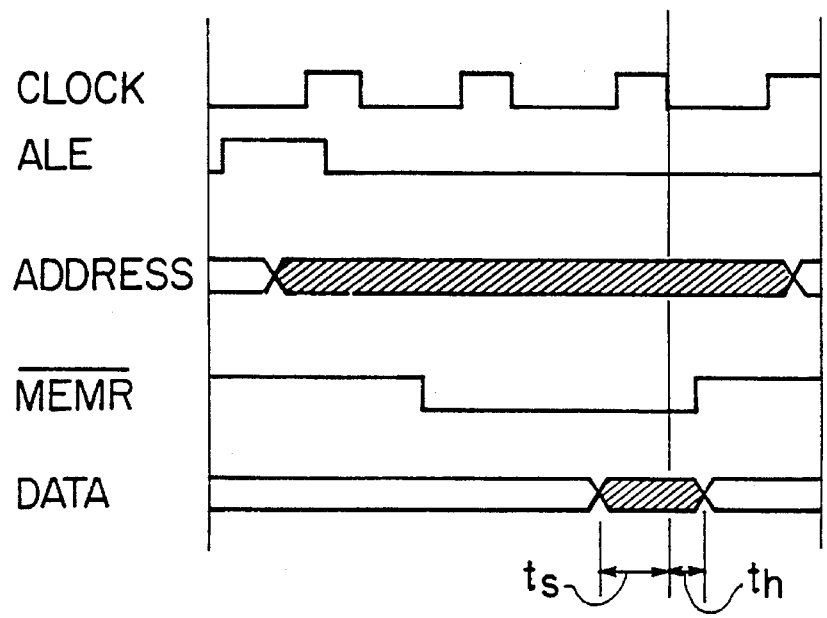
FIG. 1 is a timing diagram of a typical memory read cycle in which the HOLD time and SETUP time of the data receiving terminal, in this case a CPU, is shown.
Figure 2A:
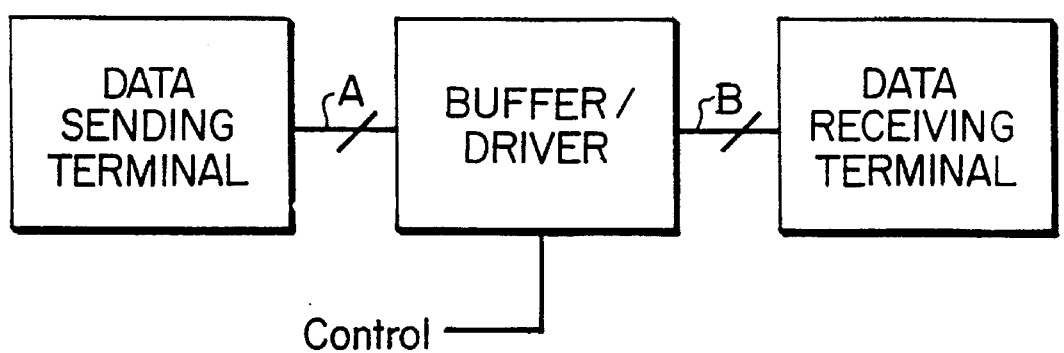
FIG. 2(a) shows a prior art configuration of the buffer/driver in serial between the data sending terminal and data receiving terminal.
Figure 5:
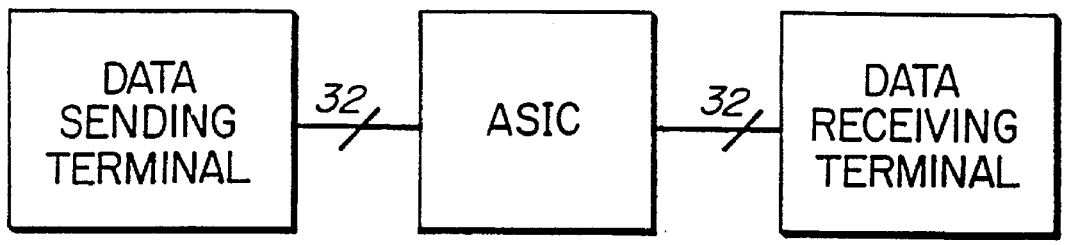
FIG. 5 shows an data processing system incorporating a ASIC when using the traditional serial configuration of data buffer/driver.
Figure 6:
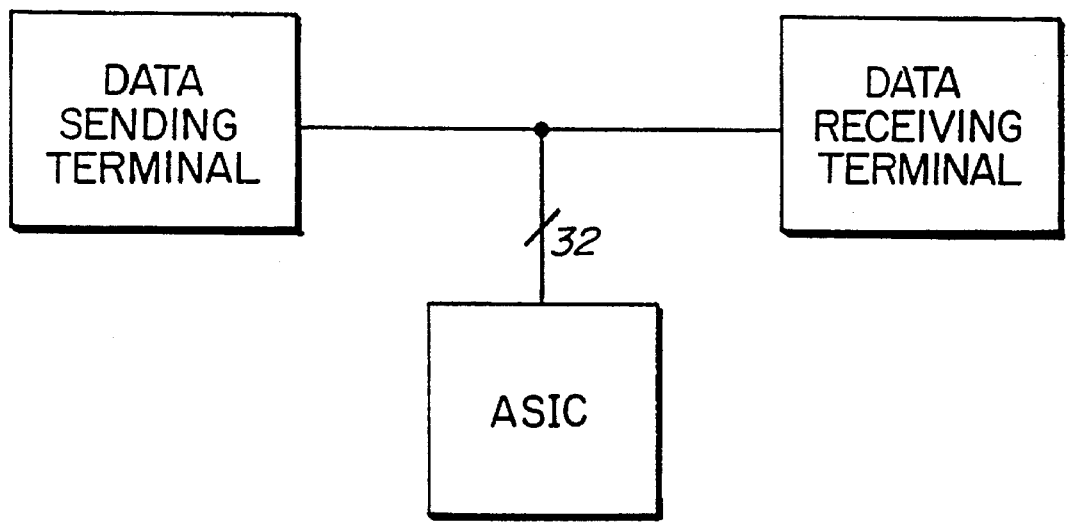
FIG. 6 shows a data processing system incorporating an ASIC when using the parallel configuration of data buffer/driver according to the present invention, in which only half the number of data pins of the configuration of FIG. 5 are required.

As the traditional serial configuration of the buffer/driver of FIG. 2(a) and other complicated circuit functions are implemented in an Application Specific Integrated Circuit (ASIC) chip, the required data number of pins is for example, 64 in a 32 data bit computer system, as depicted in FIG. 5. However, using the parallel configuration as shown in the present invention of FIG. 3(a), the required number of data pins is reduced to 32, that is half of the number the prior art would use, in a 32 bit computer system, as depicted in FIG. 6. This decreases the number of the ASIC pins and is another merit of this invention.

I claim:

1. A data transmission system comprising:
   a first data transceiver having a first mode and a second mode wherein said first data transceiver is a data sending terminal when operating in said first mode and a data receiving terminal when operating in said second mode;
   a second data transceiver having a first mode and a second mode, wherein said second data transceiver is a data receiving terminal when operating in said first mode and a data sending terminal when operating in said second mode;
   a bidirectional bus interposed between said first data transceiver and said second data transceiver; and
   latching means coupled to said bidirectional bus for latching a data signal on the bidirectional bus and transmitting said latched data signal back to said bidirectional bus for a predetermined amount of time, wherein said data signal is output to said bidirectional bus from either said first data transceiver operating in said first mode or said second data transceiver operating in said second mode, and wherein said latching means causes said data signal to continuously remain on said bidirectional bus for a period of time beginning contemporaneous with the output of said data signal to said bidirectional bus and ending after either said first data transceiver operating in said first mode or said second data transceiver operating in said second mode completes its output to said bidirectional bus.

2. The data transmission system in accordance with claim 1, wherein said latching means comprises:
   a latch having a gate input coupled to a GATE signal, said latch having a data input coupled to said bidirectional bus for latching said data signal on said data input responsive to said GATE signal, said latch having an output; and
   a buffer having an input coupled to said output of said latch, said buffer having an output coupled to said bidirectional bus for transmitting said data signal back to said bidirectional bus responsive to an ENABLE signal.

3. A method for buffering signals in a data transmission system, said data transmission system having a data bus, a first data transceiver having a first mode and a second mode and a second data transceiver having a first mode and a second mode, wherein said first data transceiver outputs a first data signal to said data bus when operating in said first mode and receives a second data signal from said data bus when operating in said second mode, and wherein said second data transceiver receives said first data signal from said data bus when operating in said first mode and outputs said second data signal to said data bus when operating in said second mode, said method comprising:
   supplying said first data signal to said data bus from said first data transceiver operating in said first mode at a time point t1;
   latching said first data signal from said data bus with a latch at a time point t2;
   transmitting said first data signal back to said data bus with said latch for a predetermined time interval ti;
   receiving said first data signal from said data bus with said second data transceiver operating in said first mode, said first data signal received continuously from said time point t1 to a time point t2+ti, said time point t2+ti ending after said first data transceiver finishes supplying said first data signal to said bus;
   supplying said second data signal to said data bus from said second data transceiver operating in said second mode at a time point t3;
   latching said second data signal from said data bus with said latch at a time point t4;
   transmitting said second data signal back to said data bus with said latch for a predetermined time interval tj; and
   receiving said second data signal from said data bus with said first data transceiver operating in said second mode, said second data signal received continuously from said time point t3 to a time point t4+tj, said time point t4+tj ending after said second data transceiver finishes supplying said second data signal to said bus.

4. A data transmission system comprising:

a first data transceiver having a first mode and a second mode, wherein said first data transceiver is a data sending terminal when operating in said first mode and a data receiving terminal when operating in said second mode;

a second data transceiver having a first mode and a second mode, wherein said second data transceiver is a data receiving terminal when operating in said first mode and a data sending terminal when operating in said second mode;

a bidirectional data bus coupled to said first data transceiver and said second data transceiver; and a buffer/driver circuit coupled to said bidirectional data bus at a connection point between said first data transceiver and said second data transceiver, said buffer/driver circuit extending the time that a data signal remains valid on said bidirectional data bus, wherein said data signal is output to said bidirectional bus from either said first data transceiver operating in said first mode or said second data transceiver operating in said second mode, said buffer/driver circuit comprising:

a latch circuit including a latch control port, a latch input port, and a latch output port, said latch input port being coupled to said bidirectional data bus at said connection point; and a driver circuit including a driver control port, a driver input port and a driver output port, said driver output port being coupled to said connection point, said driver input port being coupled to said latch output port.

5. The data transmission system of claim 4 wherein said latch circuit is a D flip-flop, said latch input port is a D input of said D flip-flop, and said latch output port is a Q output of said D flip-flop.

6. The data transmission system of claim 5 wherein the number of D flip-flops in said buffer/driver circuit equals the number of data lines in said bidirectional data bus, and the number of driver circuits in said buffer/driver circuit equals the number of data lines in said bidirectional data bus.

7. In a computer system having a first data transceiver, a second data transceiver, and a data bus coupled therebetween, said first data transceiver outputting a first data signal to said data bus when operating in a first mode and receiving a second data signal from said data bus when operating in a second mode, said second data transceiver receiving said first data signal when operating in a first mode and outputting said second data signal when operating in a second mode, a method for extending the length of time that either said first or said second data signal remains valid on a data line of said data bus, said method comprising the steps of:

providing a latch circuit having a latch control terminal, a latch input terminal and a latch output terminal;

providing a driver circuit having a driver control terminal, a driver input terminal, and a driver output terminal;

coupling said latch input and said driver output to a point on said data line, said point being in between said first data transceiver and said second data transceiver;

responsive to a first latch control signal, latching said first data signal on said data line sent by said first data transceiver operating in said first mode;

responsive to a first driver control signal, transmitting a first latched data signal for a predetermined period of time to said data line using said driver circuit, said first latched data signal being the latched version of said first data signal, said predetermined period of time beginning before said first data transceiver finishes sending said first data signal and terminating after said first data transceiver finishes sending said first data signal;

responsive to a second latch control signal, latching said second data signal on said data line sent by said second data transceiver operating in said second mode; and responsive to a second driver control signal, transmitting a second latched data signal for a second predetermined period of time to said data line using said driver circuit, said second latched data signal being the latched version of said second data signal, said second predetermined period of time beginning before said second data transceiver finishes sending said second data signal and terminating after said second data transceiver finishes sending said second data signal.

8. The method according to claim 7, further comprising the steps of asserting said first driver control signal responsive to the deassertion of said first latch control signal, and asserting said second driver control signal responsive to the deassertion of said second latch control signal.

9. A data transmission system comprising:

a data bus;

a data-sending terminal connected to said data bus, said data sending terminal outputting a data signal to said data bus at a time t1 and for a period of time p1;

a data receiving terminal connected to said data bus, said data receiving terminal receiving said data signal from said data bus, said data receiving terminal requiring at least a time period of p2 to correctly receive said data signal, said time period p2 greater than said time period p1; and latching means connected to said data bus for latching said data signal on said data bus and transmitting said latched data signal back to said data bus at a time t2 for a predefined period of time t3, wherein said data signal remains continuously on said data bus for a length of time beginning at said time t1 and ending at said time t2+t3, wherein said length of time is greater than or equal to said time period p2.

10. In a data transmission system having a data bus, a data sending terminal outputting a data signal to said data bus at a time t1 and for a period of time p1, and a data receiving terminal receiving said data signal from said data bus, said data receiving terminal requiring at least a time period of p2 to correctly receive said data signal, said time period p2 greater than said time period p1, a method of maintaining said data signal continuously on said data bus for at least said time period p2, said method comprising the steps of:

latching said data signal with a latch coupled to said data bus; and transmitting said data signal back onto said data bus at a time t2 for a predefined period of time t3, wherein said data signal remains continuously on said data bus for a length of time beginning at said time t1 and ending at said time t2+t3, wherein said length of time is greater than or equal to p2.

* * * * *